UNITED STATES PATENT OFFICE.

THOMAS A. EDISON, OF LLEWELLYN PARK, WEST ORANGE, NEW JERSEY, ASSIGNOR TO EDISON STORAGE BATTERY COMPANY, OF WEST ORANGE, NEW JERSEY, A CORPORATION OF NEW JERSEY.

STORAGE BATTERY.

1,083,356.  Specification of Letters Patent.  Patented Jan. 6, 1914.

No Drawing.   Application filed April 8, 1911.  Serial No. 619,673.

*To all whom it may concern:*

Be it known that I, THOMAS A. EDISON, a citizen of the United States, and a resident of Llewellyn Park, West Orange, in the county of Essex and State of New Jersey, have invented certain new and useful Improvements in Storage Batteries, of which the following is a specification.

The object of my invention is to provide an active material for use in the positive electrodes of alkaline storage batteries, which shall have a greater capacity to store oxygen than the nickel hydroxid ordinarily used in such electrodes. I have found that such a material is obtained by intimately mixing from $1\frac{1}{2}$ to 3 per cent. of cobalt hydroxid with nickel hydroxid. This small percentage of cobalt hydroxid raises the capacity of the nickel hydroxid mixture to a substantially higher capacity than without the cobalt hydroxid. The reason for this result has not yet been ascertained, but it is probable that the cobalt hydroxid acts catalytically or in some way alters the physical structure. I have also found that the mixture of nickel and cobalt hydroxids possesses particularly advantageous properties as an active material for use in alkaline storage batteries when made by my improved process.

In order to prepare the active material, consisting of nickel hydroxid and cobalt hydroxid, I proceed substantially as follows:—The proper amount of cobalt sulfate is added to a nickel sulfate solution to obtain the right percentage, the solution being standardized to a known strength. This solution is then slowly added to a standardized solution of sodium hydroxid, while being stirred or otherwise agitated, so that when the reaction is complete there is present a considerable percentage of free sodium hydroxid, preferably from 10% to 12%. The precipitated pulp is then dried slowly together with a part or all of the soluble products of the reaction and the excess alkali. In this particular case, the principal soluble reaction product is sodium sulfate. The drying is accomplished by first evaporating practically all of the solution water until the precipitated pulp, together with the soluble reaction products and the excess alkali, form a cream-like mixture. This cream-like mixture is then dried very slowly. The drying of the cream-like mixture may be carried on in partially closed vessels in order that the drying may be exceedingly slow. The drying may be carried on more rapidly, but I have found that slow drying is essential to the best results. Apparently, some advantageous change in the physical structure of the product is produced by the slow drying in the presence of the strong alkali. The dried material which is easily broken into granular form is then washed in a percolator with water, until only a trace of sulfate or alkali remains. The residue is then dried, and after being crushed and screened in order to obtain a material of proper size, is ready for use in the positive electrodes of alkaline storage batteries. Other soluble salts of nickel and cobalt, or a mixture of such salts may be employed instead of the sulfate, and other soluble hydroxids or a mixture of such hydroxids instead of sodium hydroxid. The use of a considerable excess of alkali over what is generally used in such precipitations in the precipitation of the nickel and cobalt hydroxids renders the final product more efficient as an active material in the positive electrodes of alkaline storage batteries and the mixture has an increased capacity to store oxygen over the nickel hydroxid made without cobalt. This may be due to porosity or other changes in physical structure brought about by the cobalt, or to some catalytic action of the cobalt. The degree of porosity or other changes in structure of the final product may be controlled by varying the percentage of excess alkali, which during the long period of drying has some beneficial action.

In application Serial No. 619,674 filed herewith, I have described and claimed a similar method applied to the production of nickel hydroxid for use in alkaline storage batteries, but in which a less percentage of excess of alkali is desirable. The presence of the cobalt hydroxid tends to decrease the loading weight, and for this reason an excess of alkali as great as 10 or 12% is used where cobalt hydroxid is mixed with the nickel hydroxid, whereas about 8% excess is sufficient where the nickel hydroxid is used without the cobalt hydroxid.

Having now described my invention, what I claim as new and desire to secure by Letters Patent is as follows:—

1. An active material for the positive electrodes of alkaline storage batteries consisting of nickel hydroxid containing a small percentage of cobalt hydroxid, substantially as described.

2. The process of manufacturing active material for the positive electrodes of alkaline storage batteries, which consists in precipitating a mixture of nickel and cobalt hydroxids from a solution of salts of nickel and cobalt, drying the precipitated pulp together with a portion or all of the reaction product or products, washing out the soluble reaction product or products, and finally drying the residue, substantially as described.

3. The process of manufacturing active material for the positive electrodes of alkaline storage batteries, which consists in adding a predetermined considerable excess of alkali over the amount necessary to effect complete precipitation to a solution of a salt of nickel containing a small percentage of a salt of cobalt, drying the precipitated pulp together with a portion or all of the soluble reaction product or products and excess alkali, washing out the excess alkali and the soluble reaction product or products, and finally drying the residue, substantially as described.

4. The process of manufacturing active material for the positive electrodes of alkaline storage batteries, which consists in adding from 2 to 12% excess of alkali over the amount necessary to effect complete precipitation to a solution of a salt of nickel containing a small percentage of a salt of cobalt, drying the precipitated pulp together with a portion or all of the soluble reaction product or products and excess alkali, washing out the excess alkali and the soluble reaction product or products, and finally drying the residue, substantially as described.

5. An active material for the positive electrodes of alkaline storage batteries, consisting of nickel hydroxid containing not more than 5% of cobalt hydroxid, substantially as described.

6. An active material for the positive electrodes of alkaline storage batteries consisting of nickel hydroxid containing a small percentage of cobalt hydroxid made by precipitation with a considerable excess of alkali, and dried exceedingly slowly in the presence of the soluble reaction product or products and the excess alkali, substantially as described.

7. An active material for the positive electrodes of alkaline storage batteries, consisting of nickel hydroxid in porous condition and containing a small percentage of cobalt hydroxid, substantially as described.

This specification signed and witnessed this 7th day of April 1911.

THOS. A. EDISON.

Witnesses:
HENRY LANAHAN,
ANNA R. KLEHM.